United States Patent [19]

Finnegan

[11] Patent Number: 4,978,947
[45] Date of Patent: Dec. 18, 1990

[54] RUPTURABLE FLUID FLOW INDICATOR

[75] Inventor: Michael C. Finnegan, Limerick, Ireland

[73] Assignee: BS&B Safety Systems, Inc., Tulsa, Okla.

[21] Appl. No.: 342,960

[22] Filed: May 25, 1989

[51] Int. Cl.[5] .............................................. G08B 21/00
[52] U.S. Cl. .................................... 340/611; 116/266; 137/68.1; 137/557; 200/61.08
[58] Field of Search ............... 340/611, 626; 137/68.1, 137/557; 200/61.08; 116/266, 272, 273

[56] References Cited

U.S. PATENT DOCUMENTS

| 3,709,239 | 1/1973 | Morck, Jr. | 137/68.1 |
| 3,770,918 | 1/1973 | Fortmann | 200/61.08 |
| 4,301,938 | 11/1981 | Wood et al. | 137/68.1 |
| 4,342,988 | 8/1982 | Thompson et al. | 340/679 |
| 4,372,334 | 2/1983 | Paul, Jr. | 137/557 |
| 4,408,194 | 10/1983 | Thompson | 340/626 |
| 4,546,652 | 10/1985 | Virkar et al. | 73/776 |
| 4,905,722 | 3/1990 | Rooker et al. | 137/68.1 |
| 4,951,697 | 8/1990 | Fritts | 137/68.1 |

Primary Examiner—Joseph A. Orsino
Assistant Examiner—Jill Jackson
Attorney, Agent, or Firm—Laney, Dougherty, Hessin & Beavers

[57] ABSTRACT

A rupturable fluid flow indicator and a rupture disk assembly including the indicator are provided. The indicator is comprised of a rupturable member adapted to be clamped across a fluid flow passageway having at least one opening formed therein for weakening a portion of the member. An electric current conductor adapted to be electrically connected in an alarm circuit is attached across the weakened portion of the rupturable member whereby when the member ruptures as a result of fluid pressure exerted thereon, the conductor also ruptures.

11 Claims, 2 Drawing Sheets

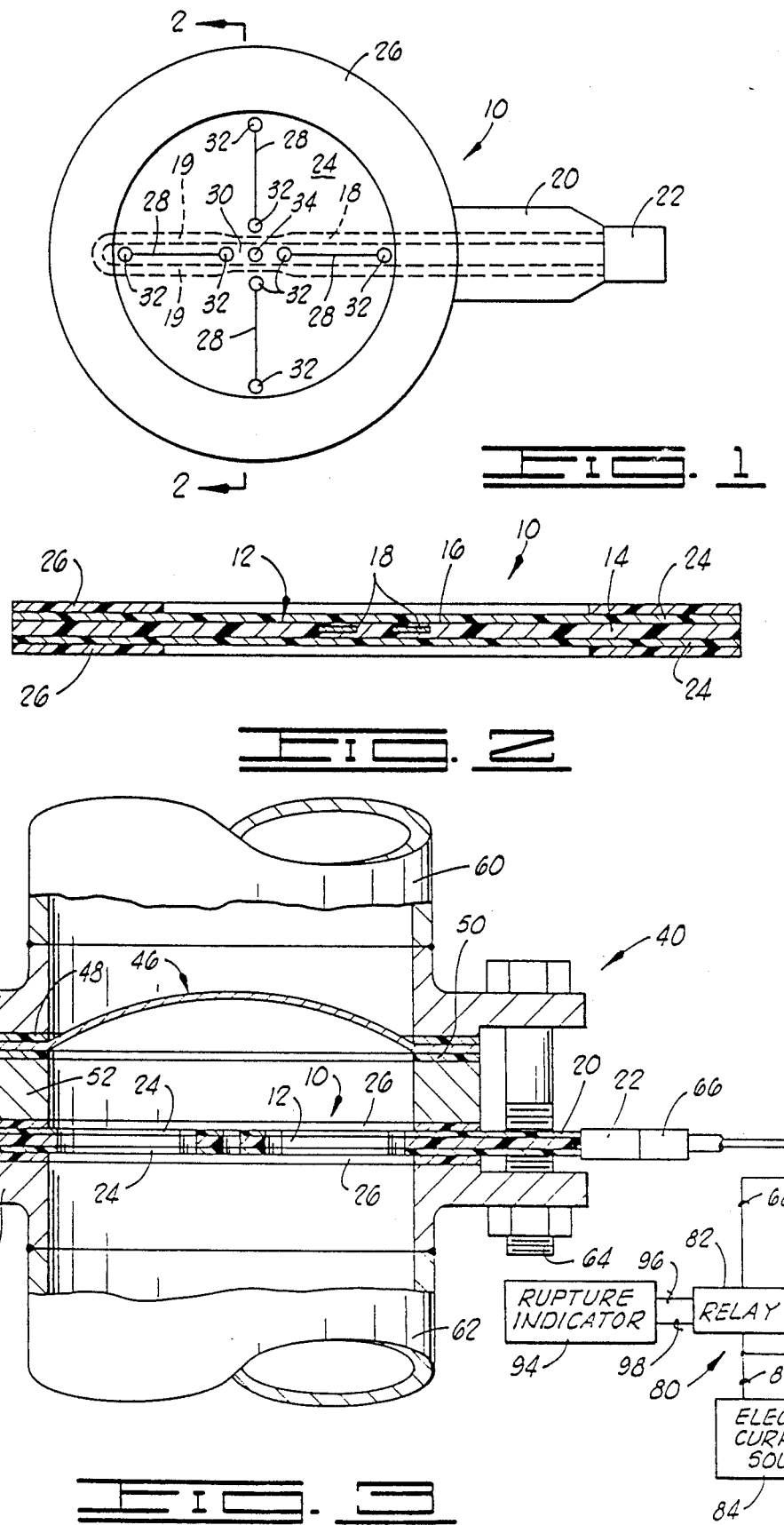

RUPTURABLE FLUID FLOW INDICATOR

BACKGROUND OF THE INVENTION

1. Field of the Invention

The present invention relates generally to rupturable fluid flow indicators, and more particularly, to such indicators used in conjunction with rupture disks to indicate rupture.

2. Description of the Prior Art

Safety pressure relief apparatus of the rupturable type are often utilized in applications where an indication of the operation of the apparatus is desirable or necessary. For example, in plants for carrying out chemical processes, when a rupturable pressure relief apparatus ruptures and relieves pressurized fluid from a vessel or system, it is generally necessary to shut down a portion of the plant or to take some other immediate corrective action. Accordingly, an alarm or other immediate indication of the operation of the pressure relief apparatus is highly desirable.

Fluid pressure rupturable apparatus generally include one or more rupture disks sealingly clamped between annular supporting members which are bolted together or which are clamped between bolted flanges. Thus, when a rupture disk ruptures as a result of excessive fluid pressure, or when the rupture disk fails for any other reason, an indication of the rupture or failure may not be given other than by the resulting change in the pressure condition of the vessel or system being protected. In certain situations, the pressure condition of the vessel or system will not change appreciably whereby the rupture or failure of the rupture disk will go unnoticed for some period of time causing undesirable results.

Rupture disk monitoring devices and rupture disk alarm systems have been developed and utilized heretofore. For example, U.S. Pat. No. 3,770,918 issued Nov. 6, 1979 is directed to a monitoring device for a reversible rupture disk which includes electric probes positioned in the space behind the rupture disk. U.S. Pat. No. 4,342,988 issued Aug. 3, 1982 is directed to a rupture disk alarm system which includes a signal carrying means in touching relationship with the rupture disk which is altered by movement of the rupture disk. U.S. Pat. No. 4,408,194 issued Oct. 4, 1983 is directed to a rupture disk monitor which includes capacitor means positioned in spaced relationship to the rupture disk to sense the operation of the rupture disk.

While the prior art rupture disk monitoring devices and systems have achieved varying degrees of success, they generally are not suitable or reliable in high temperature and/or highly corrosive applications and do not operate consistently unless full opening of the rupture disk occurs. Other problems which are encountered with various ones of the prior art devices include the shearing of the electric current conductor wires or strips by the rupture disk supporting flanges, the corrosion of the wires or strips by the fluids involved, the breaking or damaging of the device when handled and installed and other similar problems.

By the present invention an improved rupturable fluid flow indicator is provided which can be utilized to indicate the operation or failure of a rupture disk and which obviates the various problems mentioned above.

SUMMARY OF THE INVENTION

A rupturable fluid flow indicator which can be utilized by itself to indicate fluid flow, but which is particularly suitable for use in conjunction with a rupture disk to indicate the rupture or failure thereof is provided. The rupturable fluid flow indicator is basically comprised of a rupturable member adapted to be clamped across a fluid flow passageway having at least one opening for weakening the rupture member formed therein, and an electric current conductor adapted to be electrically connected in an alarm circuit attached across the weakened portion of the rupturable member. When the weakened portion of the rupturable member ruptures as a result of fluid flow force or fluid pressure exerted thereon, the electric current conductor also ruptures which activates the alarm circuit.

A preferred rupturable member includes a plurality of openings in the form of one or more of holes, slits and slots which define lines of weakness therein. The electric current conductor is positioned with respect to such lines of weakness whereby when fluid flow upstream of the rupturable member occurs, and as a result, fluid flow force and/or fluid pressure is exerted on the rupturable member, the rupturable member ruptures along the lines of weakness which in turn causes the electric current conductor to be ruptured.

In another aspect of the present invention a rupture disk assembly which provides an immediate indication of when the rupture disk in the assembly ruptures and allows pressurized fluid to flow therethrough is provided. The assembly comprises a rupture disk adapted to be clamped across a fluid flow passageway and to rupture when a predetermined fluid pressure is exerted thereon, a rupturable fluid flow indicator positioned on the downstream side of the rupture disk, means for clamping the rupture disk and the fluid flow indicator across a fluid flow passageway attached thereto and to the passageway; and an alarm circuit connected to the fluid flow indicator which provides an immediate indication of the rupture.

In applications where the rupturable fluid flow indicator must detect small leaks as well as full fluid flow through a rupture disk, a sealing membrane can be attached to the indicator for preventing fluid flow through the openings therein until the membrane ruptures as a result of fluid pressure exerted thereon.

It is, therefore, a general object of the present invention to provide a rupturable fluid flow indicator.

A further object of the present invention is the provision of a rupturable fluid flow indicator which is suitable for use in applications involving high temperatures and/or highly corrosive fluids and which can be used to detect small leaks as well as full fluid flow.

Yet a further object of the present invention is the provision of a rupturable fluid flow indicator which can be reliably utilized in combination with a rupture disk to detect rupture disk rupture or failure.

Other and further objects, features and advantage of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a plan view of a rupturable fluid flow indicator of the present invention.

FIG. 2 is an enlarged cross-sectional view taken along line 2—2 of FIG. 1.

FIG. 3 is a partially sectional and partially schematic view of a rupture disk assembly including the rupturable fluid flow indicator of the present invention connected in an alarm circuit.

DESCRIPTION OF PREFERRED EMBODIMENTS

Figure 4:
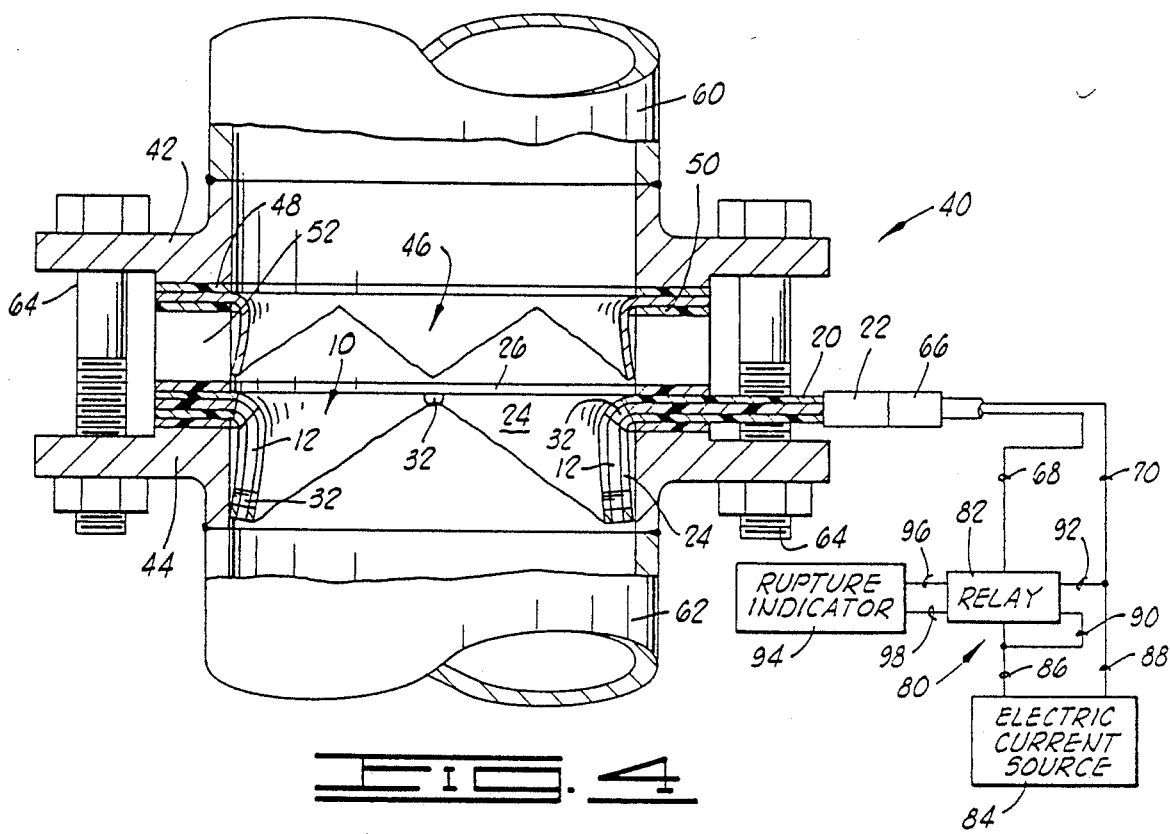
FIG. 4 is a view similar to FIG. 3, but showing the assembly after rupture of the rupture disk and rupturable fluid flow indicator thereof.

Referring now to the drawings, and particularly to FIGS. 1 and 2, a rupturable fluid flow indicator of the present invention is illustrated and generally designated by the numeral 10. The indicator 10 includes a rupturable member 12 adapted to be clamped across a fluid flow passageway. That is, the rupturable member 12 is of a size and configuration such that it can be clamped between supporting members such as a pair of complementary bolted flanges. In the most common and preferred form, the rupturable member 12 is circular and includes an outer annular flat flange portion 14 for coacting with annular supporting member surfaces connected to a flat interior portion 16.

The rupturable member 12 is preferably formed of a material which is impervious to corrosive fluids and high temperatures, and which can be made to rupture at a low fluid flow force and/or fluid pressure exerted thereon. Resinous materials are particularly suitable. The term "resinous material" is used herein to include any of a variety of thermoplastic, thermoset or other plastic materials which are resistant to high temperature deformation or deterioration and are corrosion resistant. Preferred such resinous materials are those selected from the group consisting of polyesters, polyimides, polyolefins, poly(arylene sulfides) and the like.

Attached to the rupturable member 12 is an electric current conductor 18 adapted to be electrically connected in an alarm circuit. The conductor 18 is positioned with respect to the interior portion 16 of the member 12 whereby when such portion of the member 12 ruptures as a result of fluid flow force and/or fluid pressure exerted thereon, the conductor 18 also ruptures. The electric current conductor 18 is preferably U-shaped and is encapsulated within the resinous material making up the rupturable member 12. In a preferred arrangement, the conductor 18 is positioned across the center of the interior portion 16 of the rupturable member 12 and extends outwardly beyond the periphery of the rupturable member 12 by means of an integral tab 20 formed as a part thereof. Attached to the outer end of the tab 20 and to the ends of the U-shaped conductor 18 is an electric connector 22 for connecting the conductor 18 in an alarm circuit.

The electric current conductor 18 can be formed of a variety of conductive metallic materials. Preferred such metallic materials are those selected from the group consisting of silver, nickel, chromium, iron, copper and alloys of such metals. In one preferred embodiment, the conductor 18 is formed of a nickel-chromium alloy such an Inconel ® marketed by Inco Alloys International, Inc., and is encapsulated between layers of the resinous material making up the rupturable member 12 as illustrated in FIG. 2. As will be understood by those skilled in the art, a variety of metals and metal alloys can be utilized to form the conductor 18 and a variety of techniques can be used for attaching the conductor 18 to the rupturable member 12. For example, in another preferred embodiment, the conductor 18 is formed of silver on a layer of resinous material making up the rupturable member 12 by a screen printing technique with a second layer of resinous material laminated to the first layer over the silver conductor.

In order to further prevent the metal conductor 18 and rupturable member 12 from being subjected to deterioration by corrosive fluids in contact therewith, the rupturable member 12 is preferably coated on both sides with a protective coating 24. While a variety of protective coatings can be utilized, coatings selected from the group consisting of tetrafluoroethylene polymers and chloro-paraxylylene polymers are preferred. Of these, commercially available polytetrafluoroethylene marketed under the trade name TEFLON ® by DuPont de Nemours, E.I. & Company and polychloro-paraxylylene marketed under the trade name PARYLENE ® by the Union Carbide Company are particularly suitable.

A pair of gaskets 26 are optionally positioned on opposite sides of the coated rupturable member 12. The gaskets 26 are preferably bonded to the member 12, and are also formed of materials which can be subjected to high temperatures and are corrosion resistant. Such materials include glass filled polyimide resinous material, graphite and the like.

The rupturable member 12 with or without the optional coating 24 thereon includes a plurality of openings therein in the form of one or more of holes, slits and slots. The openings are disposed in the interior portion 16 of the rupturable member 12 and function to weaken the interior portion whereby it readily ruptures and opens when subjected to the force of fluid flow and/or fluid pressure. In one preferred arrangement, the interior portion 16 of the rupturable member 12 including the coating 24 thereon has four equally spaced slits 28 formed therethrough which extend radially outwardly from a central portion 30 of the rupturable member 12 to the periphery of the interior portion 16 thereof. The ends of each of the slits 28 preferably terminate in holes 32, and a hole 34 is disposed in the rupturable member 12 at substantially the center of the central portion 30, all as shown best in FIG. 1. The slits 28, holes 32 and central hole 34 define lines of weakness in the interior portion 16 of the rupturable member 12 along which the rupturable member opens and ruptures as a result of fluid flow force and/or fluid pressure exerted thereon. Specifically, the rupturable member 12 ruptures between the interior holes 32 and the central hole 34 whereby the central portion 16 of the rupturable member 12 opens in four sector-shaped petals as will be described further hereinbelow. The electric current conductor 18 is positioned across the interior portion 16 of the rupturable member 12 whereby it intersects at least one line of weakness formed by the holes 32 and slits 28 and simultaneously ruptures with the rupturable member 12. As illustrated in FIG. 1, the conductor 18 is preferably formed in a U-shape with the legs 19 thereof positioned whereby one line of weakness formed by four of the holes 32, two of the slits 28 and the central hole 34 lie between the legs 19, and the other line of weakness formed by the other four holes 32, two slits 28 and central hole 34 intersect the legs 19 at right angles.

In order to insure rupture of the conductor legs 19, they are preferably reduced in thickness at the location of intersection with the line of weakness as shown in FIG. 1.

Referring now to FIGS. 3 and 4, a rupture disk assembly which includes the rupturable fluid flow indicator 10 of the present invention is illustrated before and after rupture, respectively. The rupture disk assembly is generally designated by the numeral 40, and includes a pair of bolted pipe flanges 42 and 44 between which are clamped a rupture disk 46, rupture disk gaskets 48 and 50, an annular spacer 52, and the rupturable fluid flow indicator 10. The inlet pipe flange 42 is connected to an inlet conduit 60 which is in turn connected to a vessel or system containing fluids under pressure. The rupture disk 46 as shown in FIG. 3 is a reverse buckling scored disk, and the rupturable fluid flow indicator 10 is spaced a distance downstream of the rupture disk 46 by the annular spacer 52. The outlet flange 44 is connected to an outlet conduit 62 which conducts pressurized fluids which flow through the passageway defined by the pipe flanges 42 and 44 and spacer 52 to a point of storage or disposal.

The pipe flanges 42 and 44 are sealingly clamped with the rupture disk 46, the rupturable fluid flow indicator 10 and other components described above therebetween by a plurality of bolts and nuts designated by the numeral 64. The outwardly extending tab 20 of the indicator 10 extends to the exterior of the flanges 42 and 44, and the connector 22 attached thereto is connected to a complementary connector 66. The connector 66 is in turn connected to a pair of wires 68 and 70 which form a part of an alarm circuit 80 which is illustrated schematically in FIGS. 3 and 4.

The alarm circuit 80 illustrated in FIGS. 3 and 4 is a simple and basic type of circuit which can be utilized, and it is to be understood that a great variety of other alarm components and circuits can be used in conjunction with the rupturable fluid flow indicator 10. The alarm circuit 80 includes a relay 82, the first set of contacts of which are connected to the wire 68. An electric current source 84 is connected to the first set of contacts of the relay 82 by a wire 86 and to the wire 70 by a wire 88. Additional wires 90 and 92 connect a second set of contacts of the relay 82 to the electric current source 84. A rupture indicator 94, which can be a light, horn or other visual and/or audio type of alarm, is connected to the second set of contacts of the relay 82 by wires 96 and 98.

When the fluid pressure exerted on the rupture disk 46 by way of the inlet conduit 60 and inlet pipe flange 42 is normal, i.e., below the rupture pressure of the disk 46, the disk 46 remains intact and pressurized fluids are prevented from flowing through the passageway formed by the flanges 42 and 44 and the spacer 52. FIG. 4 illustrates the rupture disk assembly of FIG. 3 after the fluid pressure exerted on the rupture disk 46 by way of the inlet conduit 60 and inlet pipe flange 42 has exceeded the rupture pressure of the disk 46 and caused it to rupture. Upon rupture, the reverse buckling scored rupture disk 46 reverses itself and tears along the scores whereby sections or petals are folded downwardly and outwardly. The rupture of the rupture disk 46 allows pressurized fluid to flow into contact with the rupturable fluid flow indicator 10. Upon contacting the coated rupturable member 12 of the indicator 10, the pressurized fluid exerts an impact force on the rupturable member 12 which, along with fluid pressure exerted thereon, causes it to rupture and open along the lines of weakness formed by the openings 32, slits 28 and opening 34. That is, the rupture member 12 ruptures between the innermost holes 32 and the hole 34 and sections defined by the slits 28 fold downwardly and outwardly. The rupture of the rupture member 12 allows the pressurized fluid to flow through the passageway formed by the flanges 42 and 44 and the spacer 52. In addition, the rupture of the rupture member 12 causes the electric current conductor 18 attached thereto to also rupture. The rupture of the conductor 18 activates the alarm circuit 80 causing the relay 82 to apply current from the source 84 to the visual and/or audio indicator 94.

Figure 5:
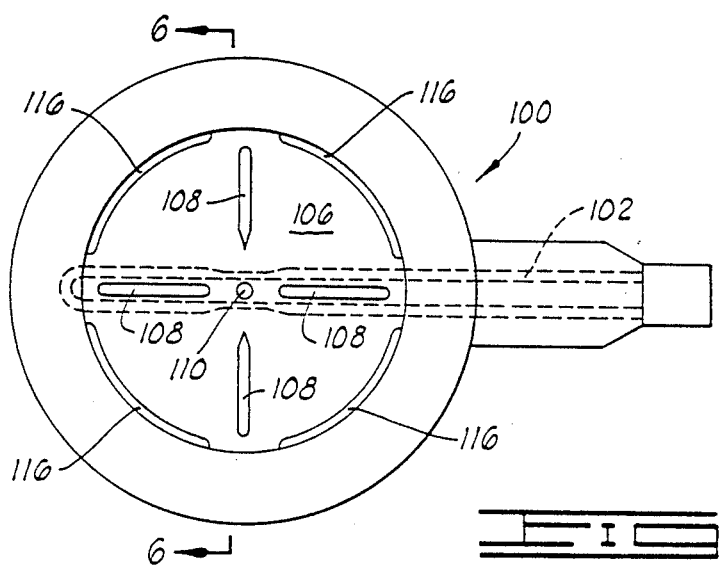
FIG. 5 is a top plan view of an alternate form of the rupturable fluid flow indicator of the present invention.
Figure 6:
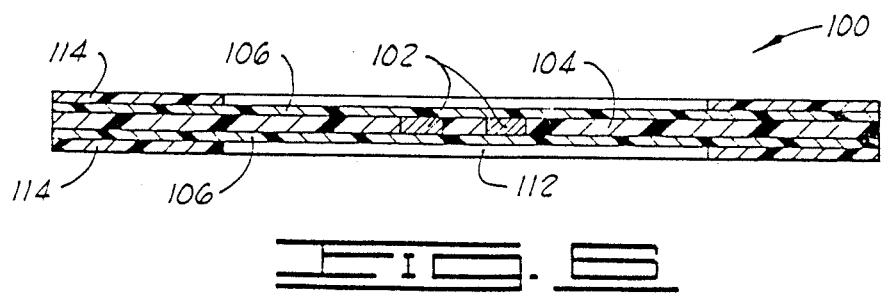
FIG. 6 is an enlarged cross-sectional view taken along line 6—6 of FIG. 5.

Referring now to FIGS. 5 and 6, an alternate form of the rupturable fluid flow indicator of the present invention is illustrated and generally designated by the numeral 100. Like the indicator 10 previously described, the indicator 100 includes a U-shaped electric current conductor 102 attached to a rupturable member 104 which is optionally coated with a protective coating 106. Instead of holes and slits, the coated rupturable member 104 includes radially extending slots 108. A central hole 110 is provided substantially at the center of the rupturable member 104. Upon rupture, the rupturable member 104 tears between the interior ends of the slots 108 and the hole 110. The conductor 102 is positioned whereby it lies across the central portion of the rupturable member 104. When the rupturable member 104 ruptures, the electric current conductor 102 is also ruptured and an alarm circuit connected thereto is activated. In order to insure that the conductor 102 ruptures, the slots 108 positioned transversely to the conductor 102 can be pointed and the pointed ends thereof positioned closer to the hole 110 as illustrated in FIG. 5. Additional peripheral arcuate slots 116 are optionally provided in the central portion of the rupturable member 104 to weaken it further if necessary to bring about rupture at the required low level of fluid flow force and/or fluid pressure exerted thereon.

In applications where it is desired that the rupturable fluid flow indicator of the present invention indicate the presence of a very minor fluid flow caused, for example, by a failure of a rupture disk whereby a pinhole leak occurs therein, the rupturable member of the indicator can include a sealing membrane attached thereto for preventing fluid flow through the openings in the rupturable member. The sealing membrane retains the leaking fluid until a fluid pressure is exerted thereon which causes its rupture as well as the rupture of the rupturable member and electric current conductor attached thereto whereby an alarm is given.

As used herein, the term "rupture" in connection with a rupture disk means that the disk ruptures as a result of the fluid pressure exerted thereon exceeding the design rupture pressure of the disk. The term "failure" means that the disk developed a premature hole or partial or complete opening due to damage, corrosion or other reason.

As will now be apparent to those skilled in the art, the rupturable fluid flow indicator of the present invention is formed of thin materials, and because of the lines of weakness formed by the openings therein, rupture occurs at low fluid flow force and/or fluid pressure exerted thereon, e.g., a force or pressure in the range of from about 3 psig to about 5 psig. In a like manner, if a sealing membrane is utilized as a part of the indicator, it is formed of a material having a thickness which readily ruptures at the low fluid pressure level set forth above.

Preferably, as shown in FIG. 6, the sealing membrane 112, if used, is attached to one side of the coated rupturable member 104, and gaskets 114 are attached to opposite sides of the coated rupturable member 104 and sealing membrane 112.

For purposes of this disclosure, the rupturable fluid flow indicator of this invention has been illustrated and described as being spaced a distance downstream from a rupture disk. However, as will be understood by those skilled in the art, the space and the use of an annular spacer between the rupture disk and indicator are optional. That is, the indicator can be positioned immediately adjacent the rupture disk and/or in contact therewith. The rupturable fluid flow indicator of the present invention can be used by itself to indicate fluid flow in a passageway or it can be used between a rupture disk and a relief valve or in other similar applications. In addition, numerous other uses and applications for the rupturable fluid flow indicator of this invention will suggest themselves to those skilled in the art as will numerous changes in the arrangement of parts and selection of materials. However, such uses, arrangements and materials are encompassed within the spirit of this invention as defined by the appended claims.

What is claimed is:

1. A rupture disk assembly which provides an immediate indication of when a rupture disk in the assembly ruptures or fails whereby pressurized fluid flows therethrough comprising:
    a rupture disk adapted to be clamped across a fluid flow passageway and to rupture when a predetermined fluid pressure is exerted thereon;
    an annular spacer positioned on the downstream side of said rupture disk;
    a fluid flow indicator positioned on the downstream side of said annular spacer, said indicator including:
        a rupturable member adapted to be clamped across a fluid flow passageway and having a plurality of openings formed therein which define lines of weakness therein; and
        an electric current conductor adapted to be electrically connected in an alarm circuit attached to said rupturable member and positioned thereon whereby when said rupturable member ruptures along said lines of weakness as a result of fluid flow force or fluid pressure exerted thereon, said conductor is also ruptured;
    means for clamping said rupture disk, said annular spacer and said fluid flow indicator across said fluid flow passageway attached thereto and to said passageway; and
    an alarm circuit for providing an immediate indication when said electric current conductor is ruptured connected to said conductor.

2. The rupture disk assembly of claim 1 wherein said rupturable member if formed of a resinous material.

3. The rupture disk assembly of claim 2 wherein said electric current conductor is encapsulated within said resinous material.

4. The rupture disk assembly of claims 2 or 3 wherein said resinous material is selected from the group consisting of polyesters, polyolefins and poly(arylene sulfides).

5. The rupture disk assembly of claim 2 wherein said rupturable member and said electric current conductor attached thereto include a protective coating thereon.

6. The rupture disk assembly of claim 5 wherein said protective coating is selected from the group consisting of tetrafluoroethylene polymers and chloro-paraxylylene polymers.

7. The rupture disk assembly of claim 6 wherein said electric current conductor is formed of a metal selected from the group consisting of silver, nickel, chromium, iron, copper and alloys of such metals.

8. The rupture disk assembly of claim 7 wherein said fluid flow indicator is further characterized to include a sealing membrane attached thereto for preventing fluid flow through said openings in said rupturable member until said membrane ruptures as a result of fluid pressure exerted thereon.

9. The rupture disk assembly of claim 7 wherein said openings formed in said rupturable member define lines of weakness therein which extend radially outwardly from the center of said member.

10. The rupture disk assembly of claim 9 wherein said electric current conductor is positioned to lie across the center of said rupturable member.

11. The rupture disk assembly of claim 10 wherein said openings in said rupturable member are comprised of one or more of holes, slits and slots.

* * * * *